United States Patent [19]

Noda

[11] Patent Number: 5,373,147

[45] Date of Patent: Dec. 13, 1994

[54] APPARATUS AND METHOD FOR DETECTING LINE SEGMENT DIRECTION

[75] Inventor: Masashi Noda, Hachiman, Japan

[73] Assignee: International Business Machines Corporation, Armonk, N.Y.

[21] Appl. No.: 122,839

[22] Filed: Sep. 15, 1993

[30] Foreign Application Priority Data

Sep. 16, 1992 [JP] Japan ................................. 4-246502

[51] Int. Cl.$^5$ ............................................. G06K 7/10
[52] U.S. Cl. .................................. 235/462; 235/384; 235/472; 235/494
[58] Field of Search ................. 235/384, 462, 472, 494

[56] References Cited

U.S. PATENT DOCUMENTS 5,276,315  1/1994  Surka ................................ 235/472

Primary Examiner—Harold Pitts
Attorney, Agent, or Firm—David Aker

[57] ABSTRACT

An apparatus and method for reading, at high speed and with high precision, an angle of an angular modulation bar code directly from a multilevel brightness image of the bar code without the need for subjecting the image to preprocessing, such as binarization (conversion to a black-and-white image). The apparatus includes: means for dividing a multilevel brightness image of a bar code into a plurality of small sampling regions having the same area; means for detecting a maximum brightness value and a minimum brightness value among brightness values of pixels in each of the small sampling regions; means for setting a measurement origin and a threshold of light and dark in each of the small regions on the basis of the maximum and minimum brightness values; means for measuring a length from the measurement origin to a point where the brightness of the pixel reaches the threshold of light and dark in each of the small regions; means for accumulating, for each direction, length values measured in all the small regions, and for judging a direction having a maximum accumulated length value to be the bar code direction.

4 Claims, 7 Drawing Sheets

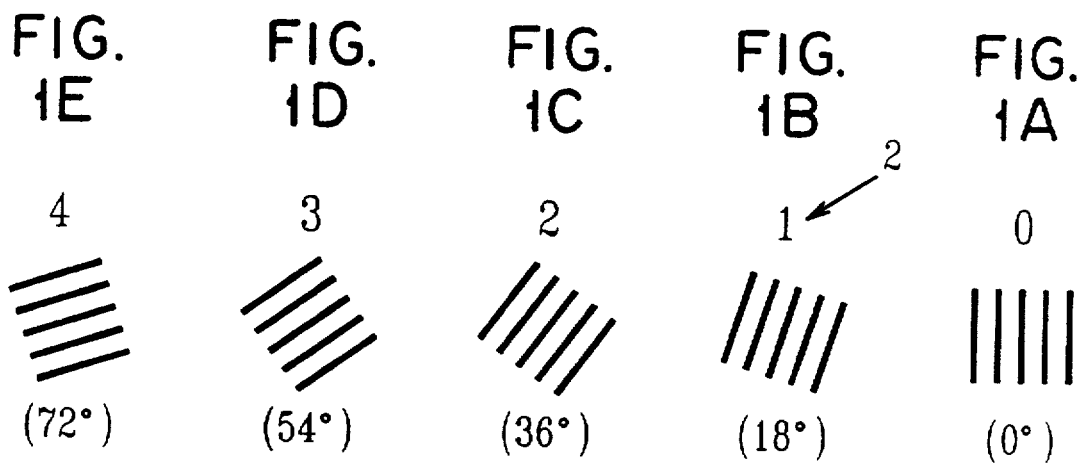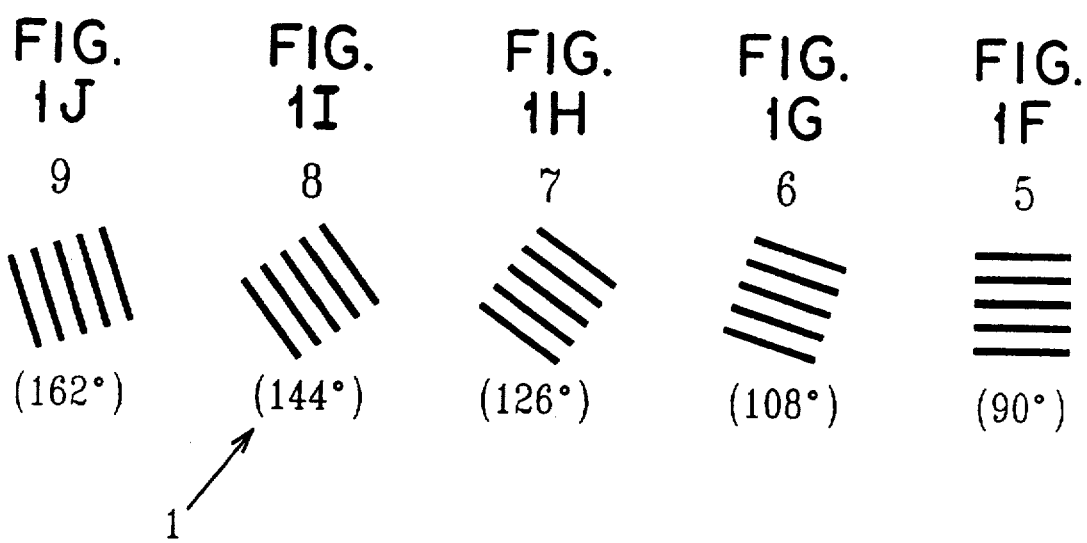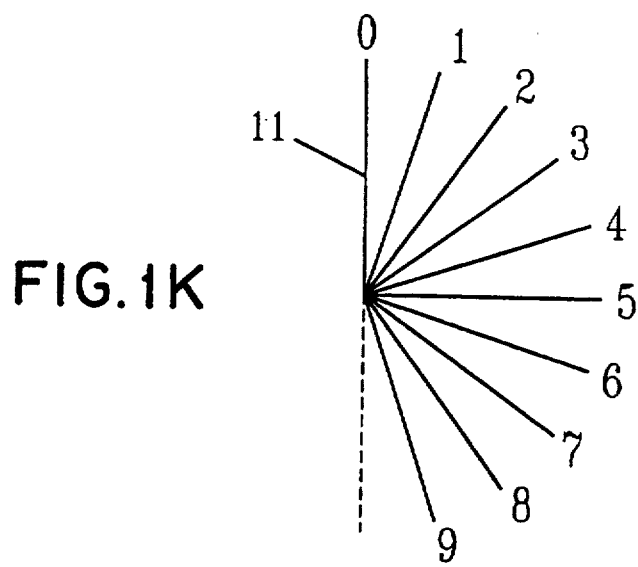

FIG. 2
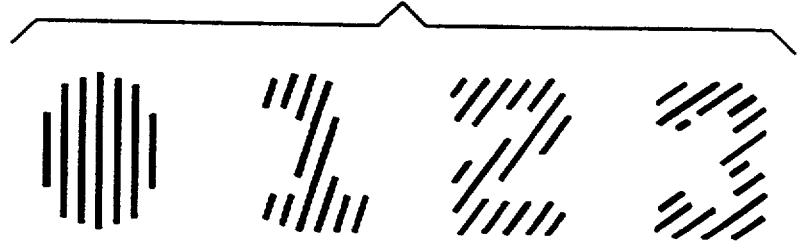
FIG. 3
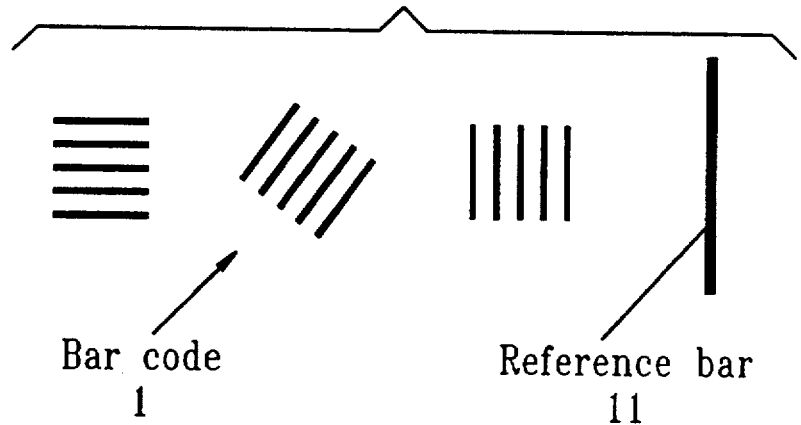
Bar code 1
Reference bar 11
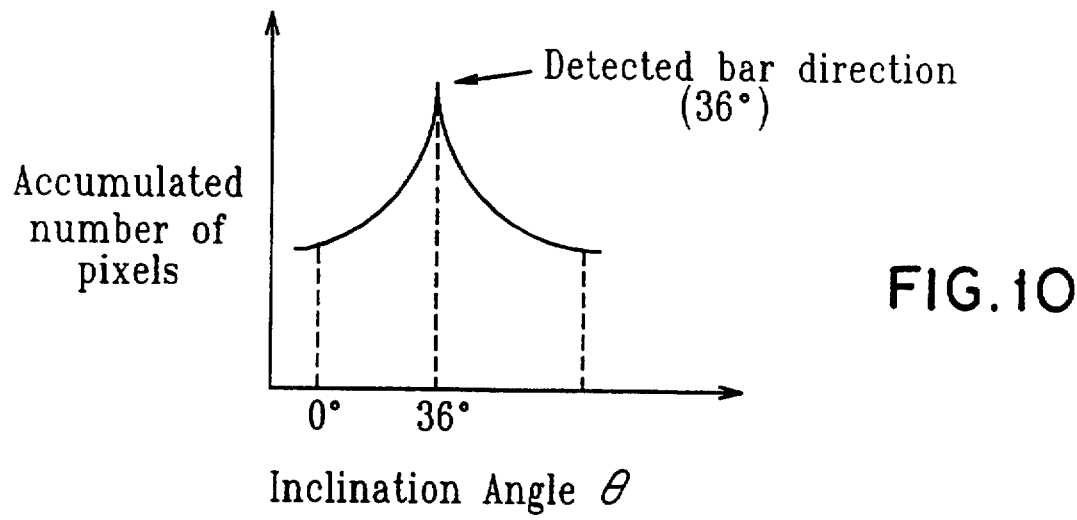
FIG. 10

APPARATUS AND METHOD FOR DETECTING LINE SEGMENT DIRECTION

FIELD OF THE INVENTION

The present invention relates to an apparatus and method for optically detecting the direction of a line segment, such as for example, the direction of a bar code that is attached to a commodity. More particularly, the invention relates to an apparatus and method capable of optically detecting, at high speed and with reliability, a line segment direction even if information on the shape of the subject line segment includes noises or defects.

BACKGROUND OF THE INVENTION

Conventionally, a bar code is attached to a commodity to provide information about that commodity. The bar code is optically read in a noncontacting manner for information processing. Bar codes used at the POS (point of sales) of supermarkets represent commodity information by the thickness or interval between the parallel black bars. The bar code is utilized in information processing for sales management and inventory control.

It is also known that a bar code represents information by its inclination, rather than the thickness or interval between the bars. For example, it is conceivable that a bar code is attached to the surface of a semiconductor IC chip, and utilized in information processing for quality control or the like. However, in a manufacturing process of semiconductor IC chips, it is impossible to maintain, in a stable manner, the width of bars formed on the surface of a chip until the end of the process because of the nature of the process and the characteristics of semiconductor IC chip materials. Considering this fact, a reference line and bars having a predetermined inclination or direction with respect to the reference line are attached to a chip surface, particular numeric information is associated with the inclination or direction of bars, and the inclination of bars is detected and then used in information processing. This type of bar code is called an angular modulation (or theta modulation) bar code. The angular modulation bar code is superior to other types of bar codes which represent information by bar widths or intervals, with the characteristic of accurately representing the information (i.e., by means of inclination or direction) even if a chip surface to which a bar code is attached is expanded or contracted.

However, even with the angular modulation bar code, which is less affected by expansion and contraction, it becomes difficult to read the inclination or direction of bars if some foreign matter associated with the semiconductor IC manufacturing process is attached to the bars, or if bars are damaged in a manner which alters their shape. Further, it is difficult with conventional techniques to detect, at high speed, the inclination of line segments of bars from a bar image having noises or defects.

In one conventional technique for detecting the inclination or direction of bars, an image of an region to which a bar code has been attached is first binarized (i.e., converted to a black-and-white image), then it is determined based on known parameters (width and length of bars) whether a black or white portion with respect to the background is a subject bar or not, and finally, an inclination is calculated from coordinates of the two ends of the portion that has been determined to be a bar. This conventional technique is disclosed in Japanese PUPA No. 2-125384. This method of calculating the inclination is in itself simple and suitable for high-speed processing. However, if foreign matter or damage to the bar code region is present, and if some defect is thereby caused in the shape of a bar or a resultant image includes noise (such noise necessarily occurs in semiconductor integrated circuit manufacturing processes), frequently the end of a portion that has been determined to be a bar is lost. As a result, the inclination of bars may not be detected. Therefore, this method does not have high reliability. Further, this method requires image pre-processing for noise elimination and binarization, which is a bottleneck in realizing high-speed processing.

In another conventional method, a bar code image is binarized (i.e., converted to a black-and-white image), one point in the image is selected as the measurement center, and then the number of black or white pixels that represent a bar is calculated from the measurement center in every possible bar inclination direction. The direction that is associated with the maximum number of pixels is determined to be the bar direction. Reference is made to Japanese PUPA No. 2-214992. However, there are some difficulties in employing this conventional method to detect the direction of a bar code attached to a semiconductor chip. In general, an image of a bar code attached to a semiconductor chip has a light-and-dark unevenness (i.e., shading), which influences the binarized image. In order to binarize the bar code image without being affected by the shading, proper pre-processing is required, which makes it difficult to speed up the entire processing. Further, in the case of images having non-uniform shading, the position of the measurement center greatly influences the reliability of the bar angle reading.

In a further conventional method, a bar code image is binarized, the entire image is scanned in every possible bar inclination direction, and a distribution of pixels representing a bar is obtained in each direction. The direction that is associated with the pixel distribution having the maximum variation is judged to be the bar code direction. In this method, even where the image includes some noise, the influence of noise can be suppressed because the entire image is scanned. However, since the entire region of the image is scanned in every direction, this method requires much processing time, and is therefore not suitable for high-speed processing. Further, if unevenness in shading exists over the entire image, the bar code information is lost, as in the case with the above conventional method.

SUMMARY OF THE INVENTION

It is an object of the present invention to provide an apparatus and method for reading a line segment direction from an image with high reliability even when the line segment has defects in its shape, or an image representing the line segment includes noise, or the image has non-uniform shading.

It is another object of the invention to provide an apparatus and method for reading a line segment direction which can detect a line segment direction directly from a multilevel brightness (white, black and gray) input image of the line segment without the need for subjecting the multilevel brightness input image to preprocessing for noise elimination or binarization, and which is therefore suitable for high-speed processing.

A line segment direction detecting apparatus according to the present invention comprises: means for generating a multilevel brightness image including a line segment; means for detecting brightness of a pixel in said image; means for selecting a plurality of small sampling regions in the image; means for detecting a maximum brightness value and a minimum brightness value among brightness values of the pixels in each of the small sampling regions; means for setting a threshold of light and dark and a measurement origin in each of the small regions on the basis of the maximum and minimum brightness values; means for measuring a length from the measurement origin to a point where the brightness of the pixel reaches the threshold of light and dark in each of the small regions; means for accumulating, for each direction, length values measured in all the small regions; and means for determining a direction having a maximum accumulated length value to the line segment direction.

According to the invention, an image of a subjection region is not processed as a whole, but is processed locally for each of the small sampling regions that are uniformly allocated over the image and the processing results are then subjected to a judgment that is performed for the entire image. As a result, the method of the invention is less affected by non-uniform shading of the image, can improve the reliability of reading a line segment direction, and can decrease the extent of access to image data to reduce the processing time, thereby enabling high-speed processing. Further, according to the invention, the line segment direction can be detected directly from the image without the need for subjecting the input image to a pre-processing for noise or defect elimination and to binarization (conversion to a black-and-white image). Therefore, the method of the invention is further suitable for high-speed reading.

BRIEF DESCRIPTION OF THE DRAWINGS

FIG. 1 illustrates an angular modulation bar code (theta modulation bar code).

FIG. 2 illustrates another angular modulation bar code.

FIG. 3 illustrates an angular modulation bar code and a reference (vertical) direction line.

FIG. 10 is a graph showing an accumulated number of pixels obtained by accumulating, for each direction, the number of pixels from the measurement origin to the point where the brightness reaches the threshold of all the small sampling regions.

DETAILED DESCRIPTION OF THE PREFERRED EMBODIMENT

Figure 4:
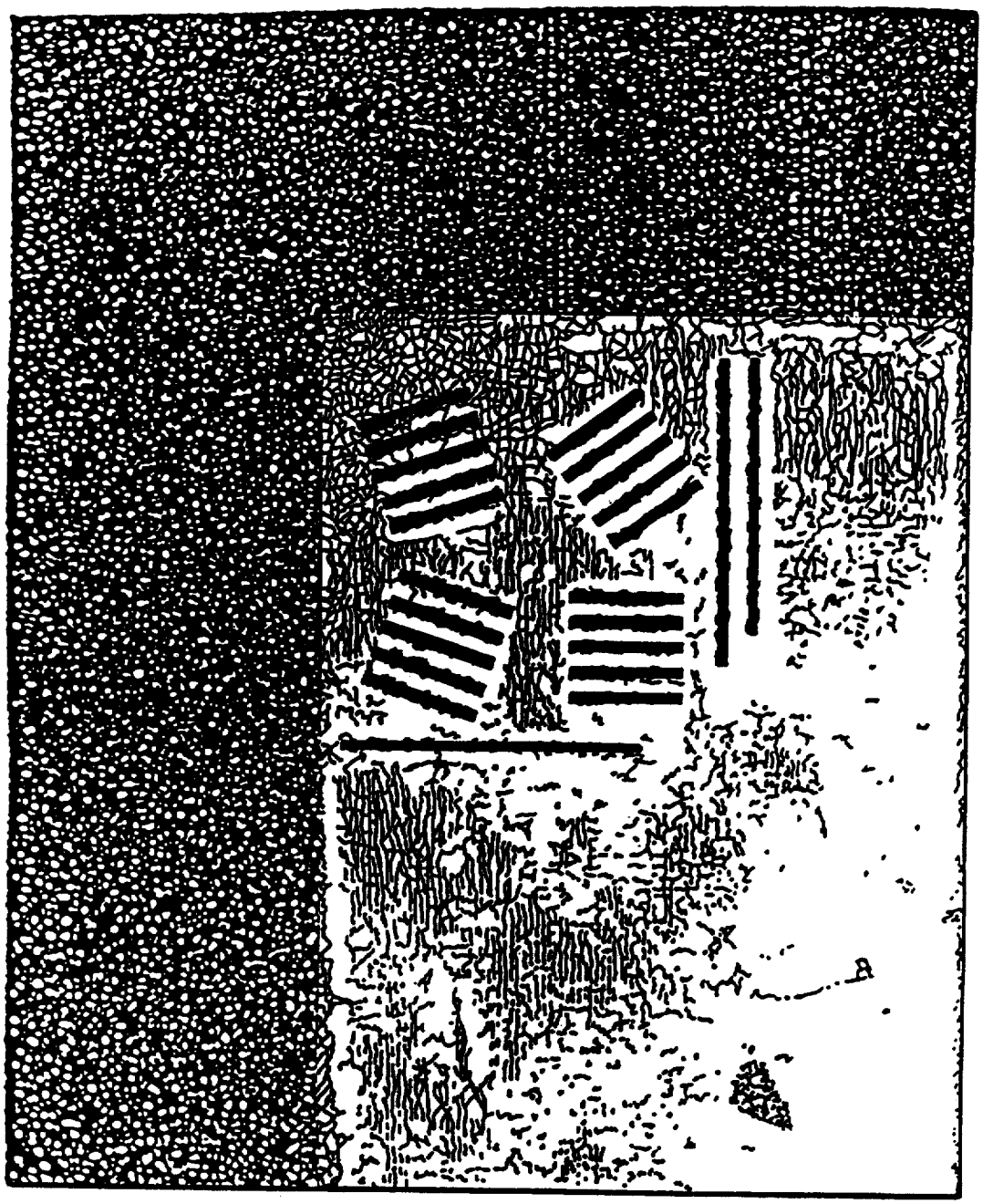
FIG. 4 is a representative image having many brightness gradations including an angular modulation bar code attached to the back surface of a semiconductor chip.

FIG. 1 shows an example of an angular modulation bar code 1 to be read by a line segment direction detecting apparatus according to an embodiment of the present invention. In this example ten codes, each consisting of five parallel bars which are inclined at an angle that increases clockwise from 0 degree with respect to a reference direction 11 (i.e., vertical direction) with an increment of 18 degrees, are assigned numbers 0, 1, 2, 3, 4, 5, 6, 7, 8 and 9, respectively. That is the number 0 is assigned to the vertical direction (0 degree), the number 1 is assigned to a direction rotated clockwise by 18 degrees from the vertical direction, the number 2 is assigned to a direction rotated clockwise by 36 degrees from the vertical direction, the number 3 is assigned to a direction rotated clockwise by 54 degrees from the vertical direction, the number 4 is assigned to a direction rotated clockwise by 72 degrees from the vertical direction, the number 5 is assigned to a direction rotated clockwise by 90 degrees from the vertical direction, the number 6 is assigned to a direction rotated clockwise by 108 degrees from the vertical direction, the number 7 is assigned to a direction rotated clockwise by 126 degrees from the vertical direction, the number 8 is assigned to a direction rotated clockwise by 144 degrees from the vertical direction, and the number 9 is assigned to a direction rotated clockwise by 162 degrees from the vertical direction. If there remains some extra area in the region to which the bar code 1 is attached, numbers 2 that are readable by a human may be added above the respective codes of the bar code 1.

Further, as shown in FIG. 2, a bar code 21 that is readably by both a human and a line segment direction detecting apparatus can be provided by making the outline of codes assume a numeral. In either case, in addition to the bar code 1, a reference direction bar 11 as shown in FIG. 3, that indicates a reference direction of the bar code 1, is attached to commodities, for example, a semiconductor IC chip.

FIG. 4 is a picture showing a reading input image including a bar code, and a reference direction bar that are attached to the back surface of an actual semiconductor IC chip at its four corners, This image has multiple level of white, black and gray e.g., 256 gradations, and is generated by an image generating means (not shown). As is known from this picture, actual images include noise originating from defects in bar shape and attached foreign matter, and a uneven shading over the image. According to the invention, the bar code direction can be read from this kind of image without the need for performing pre-processing and binarization. Thus, it can be read at high speed.

Figure 5:
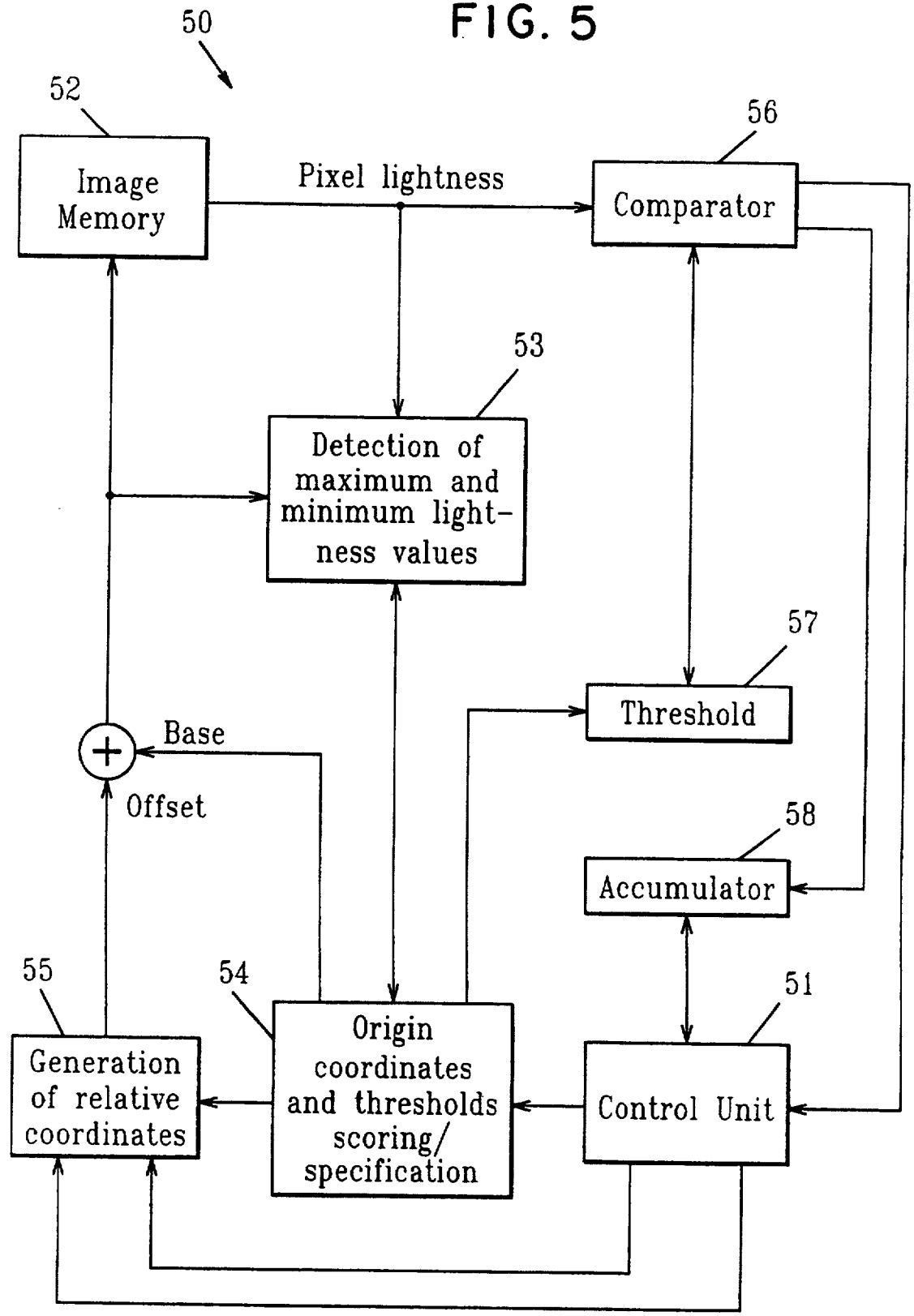
FIG. 5 is a block diagram showing a line segment direction detecting apparatus according to an embodiment of the present invention.

FIG. 5 provides a configuration for a line segment direction detecting apparatus 50 according to the embodiment of the invention. A control unit 51 controls the detecting apparatus 50 and various computations. Control unit 51 is, for example, a personal computer, such as Personal System/55 (trademark of International Business Machines Corporation) produced by IBM (trademark of International Business Machines Corporation). Detecting apparatus 50 has an image memory 52 for storing a bar code image as shown in FIG. 4 that is provided by a camera (not shown). This image is a white, black and gray image consisting of a plurality of pixels, each of which has associated therewith a brightness value of one of many levels, e.g., 256 gradations. The image stored in the image memory 52 is divined into a plurality of small sampling regions by the control unit 51, as described below. A brightness detecting means 53 detects the maximum brightness value and the minimum brightness value (i.e., maximum darkness value) among brightness values of pixels of the image stored in the image memory 52 for each small region being sampled.

Based on the maximum brightness value and the minimum brightness value (maximum darkness value) detected for each small region sampled, control unit 51 sets coordinates of the measurement origin and a threshold of light and dark for each sampling region according to a method described later. The coordinates of the measurement origins and the thresholds of light and darkness that have been set by the unit 51 are stored in an origin coordinates and thresholds storing/specifying means 54. A relative coordinates generating means 55 generates relative coordinates of pixels with respect to the measurement origin coordinates. This enables scanning from the measurement origin coordinates in directions having respective angles spaced from each other by a predetermined angular interval. To save time for calculating the coordinates of pixels, the relative coordinates generating means 55 generates, in advance, the relative coordinates of the pixels that are located along directions of predetermined angles from the measurement origin coordinates. The interval between the predetermined angles needs to be associated with an angular resolution high enough to detect the bar angle (having an interval of 18 degrees) of the bar code 1. The maximum interval of the predetermined angles generated by the relative coordinates generating means 55 is about half of the angular interval (18 degrees) of bars of the bar code 1, and is 3 degrees in this embodiment. Therefore, in accordance with instructions from the unit 51, the relative coordinates generating means 55 generates the relative coordinates of the pixels located along the directions extending from the measurement origin coordinates of all angles, ranging from 0 degree of the reference (i.e., vertical) direction specified by the reference direction bar 11 to 180 degrees and spaced from each other by 3 degrees. The relative coordinates thus generated are added to the measurement origin coordinates (base) that are sent from the origin coordinates and thresholds storing/specifying means 54. The unit 51 further specifies a width R for scanning in the predetermined directions. The pixels existing within the scanning width R along the direction of the predetermined angle from the measurement origin are sequentially picked up, and a determination is made by a comparator 56 as to whether their brightness has reached the threshold for light and dark as determined by threshold device 57. This operation is performed for all the small sampling regions, and the numbers of pixels having a brightness sufficient so that the brightness threshold has been reached is accumulated by an accumulator 58 for each predetermined angle.

Figure 6:
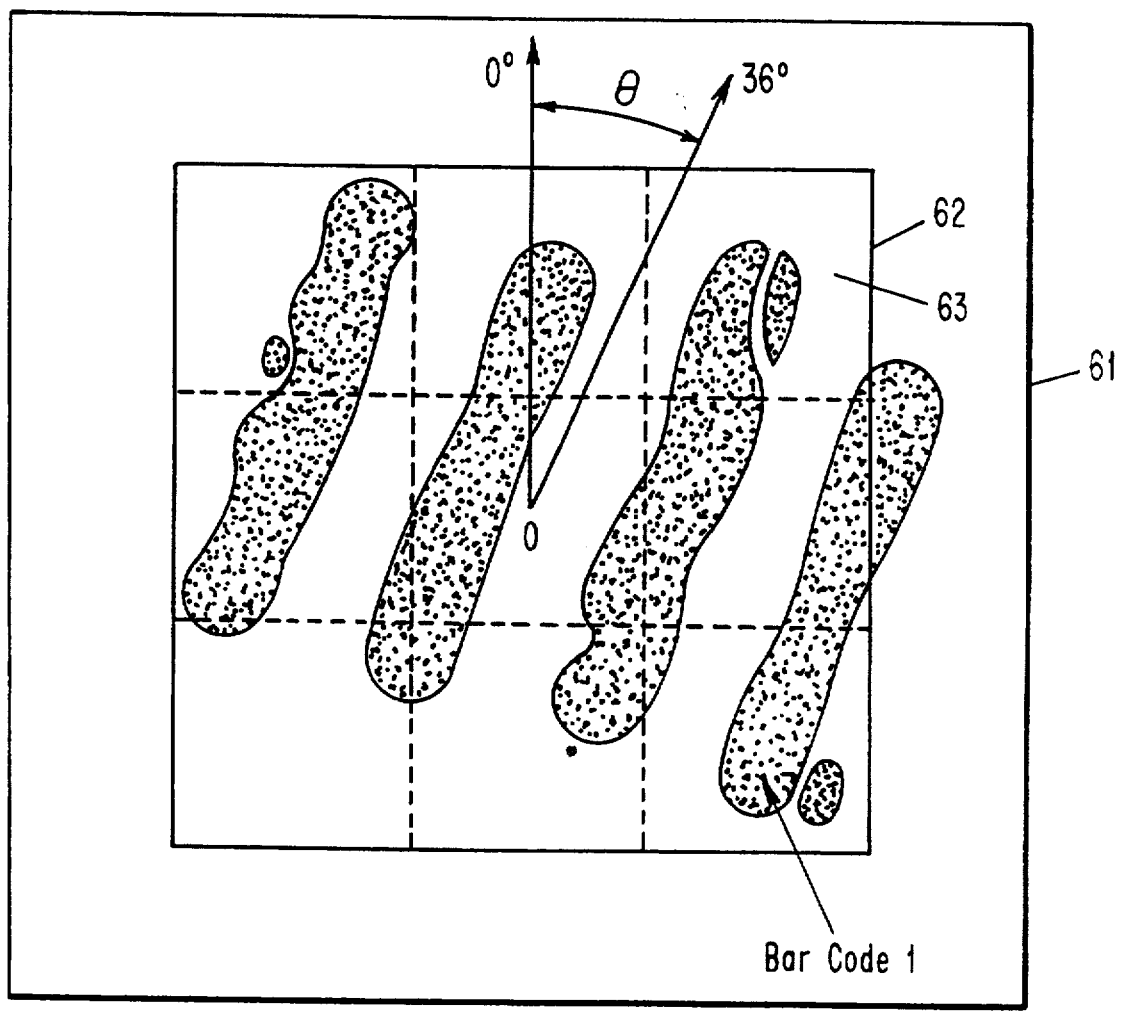
FIG. 6 illustrates a method for selecting small sampling regions in the bar code image.

Next, the method for setting the small sampling regions of the bar code image is described. FIG. 6 shows an image 61 of one bar code 1 included in the image of FIG. 4. Image 61 is picked from the image of FIG. 4 in the following manner. As shown in FIG. 4, the semiconductor chip surface is displayed more brightly than the background, because the camera (not shown) is focused on the chip surface. Therefore, two sides and one corner of the chip can be detected by the known method of extracting a high brightness portion from the background. Since the distances from the chip corner to the respective bar codes 1 are known in advance, unit 51 picks out the images 61 of the respective bar codes 1 by calculating their distances from the chip corner.

In the bar code image 61 shown in FIG. 6, one can see various defects of the bar shape and attached foreign matter (noise). The image 61 of the bar code 1 actually has white, black and gray brightness gradations of 256 levels, and consists of, for example 70×70 pixels. The center O of the bar code image 61 is positioned so as to be a predetermined distance from the corner of the chip when the bar code 1 is attached to the chip, and is used as the center when the image 61 is picked out of the image of FIG. 4. First, the unit 51 produces 9 (3×3) or 25 (5×5) small sampling regions 63 by equally dividing, horizontally and vertically, a central region 62 having the center O of the image 61 as its own center and occupying 70% of the image 61, i.e., having 50×50 pixels. Where the image 61 includes much noise, or where it is large, the number of small sampling regions is set at a large value. However, basically the number of small regions is not changed with the degree of shading (light-and-dark difference). In the embodiment of FIG. 6, with region 62 is divided equally into nine small sampling regions 63.

Figure 7:
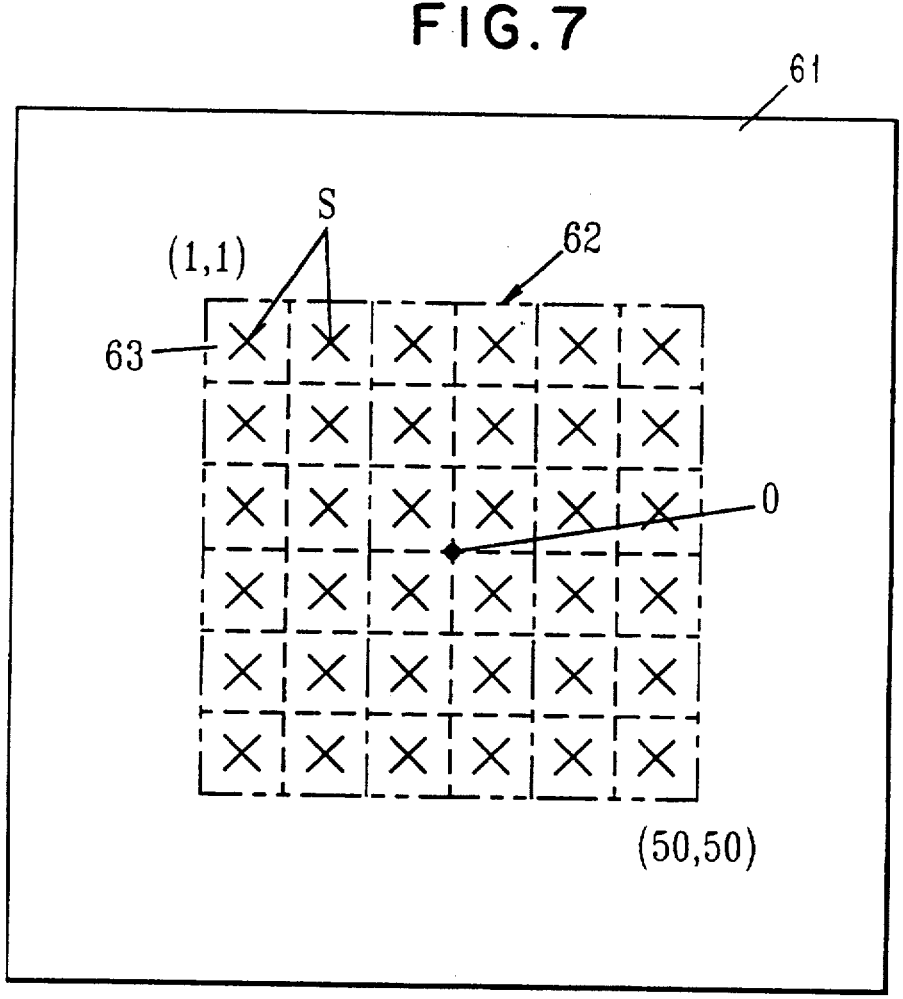
FIG. 7 illustrates a method of detecting a maximum brightness point and a maximum darkness point in a small sampling region.
Figure 8:
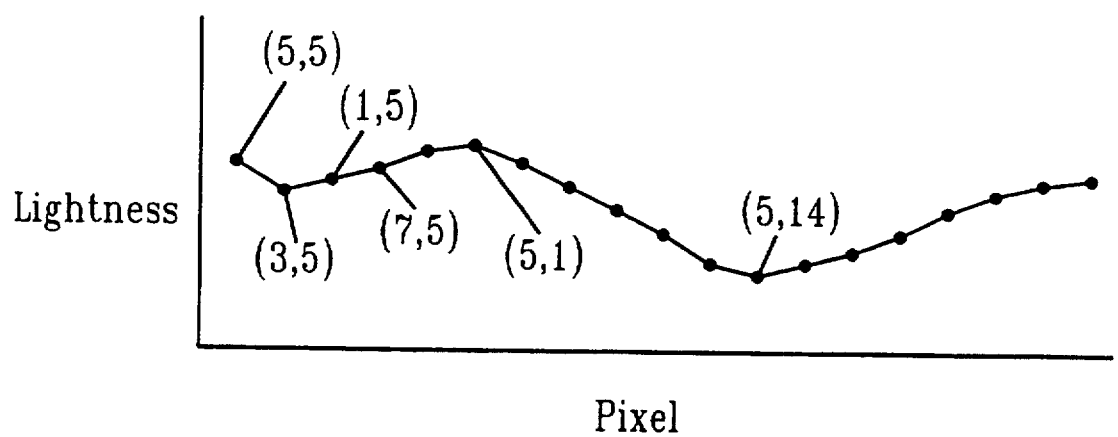
FIG. 8 is a graph showing a distribution of detected brightness values of pixels in the small sampling region.
Figure 9A:
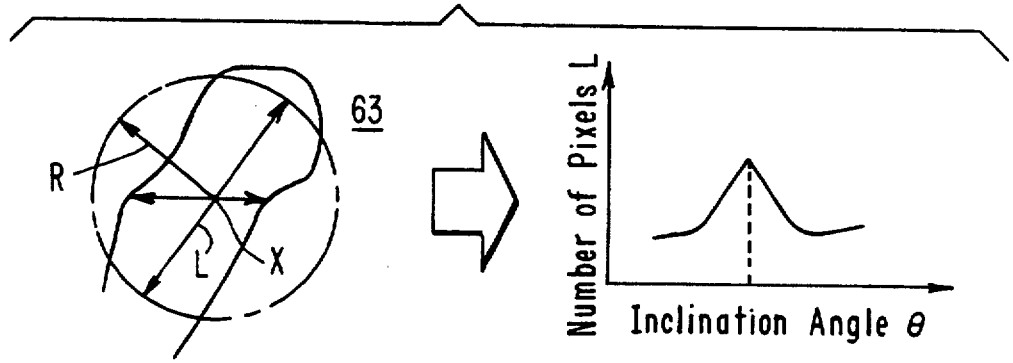
FIG. 9 illustrates a method for measuring, for each direction, the number of pixels from the measurement origin to a point where the brightness reaches the threshold of light and dark in each sampling region, and graphically shows results of the measurements.
Figure 9B:
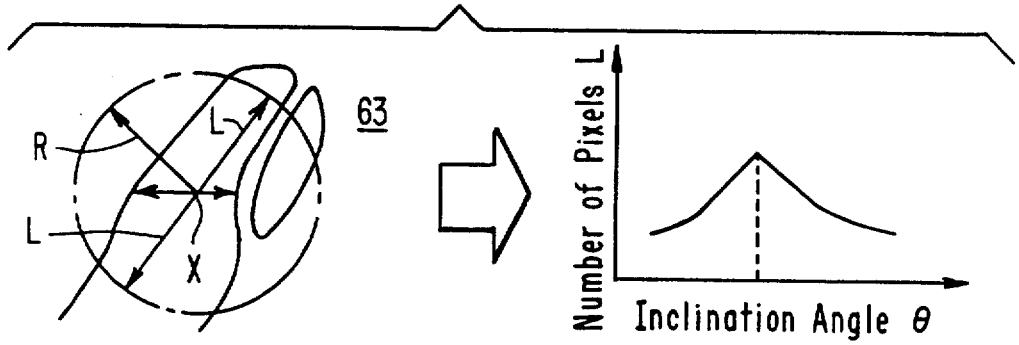
Figure 9C:
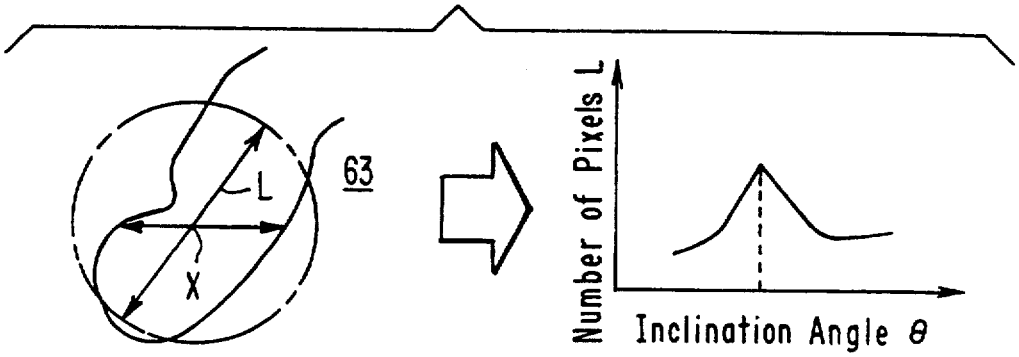
Figure 9D:
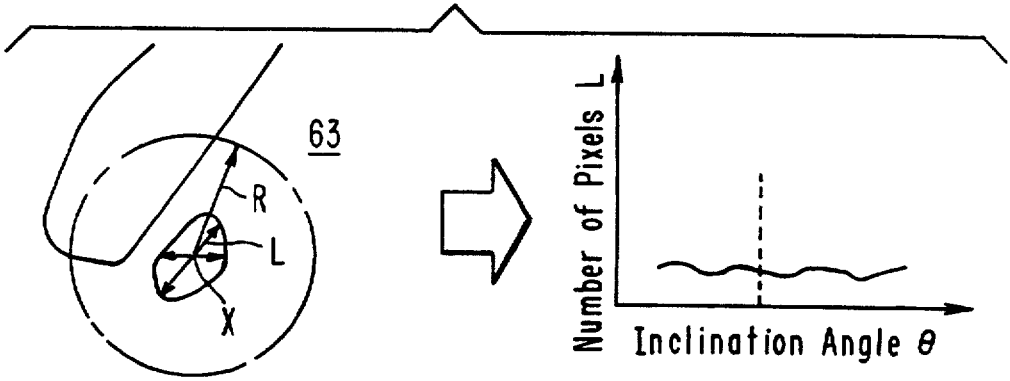

Next, scanning starting points to be used in detecting a maximum brightness pixel and a minimum brightness pixel in each small sampling region 63 are selected. As is illustrated in FIG. 7, in this embodiment the centers S of four equally divided sections of each small region 63 are employed as the start points. That is, if in FIG. 7 the upper-left corner pixel and the lower-right corner pixel of the region 62 are represented by coordinates (1, 1) and (50, 50), respectively, pixel coordinates of the centers S of the four equally divided sections of the upper-left corner small sampling region 63 in FIG. 7 are (5, 5) (5, 12), (12, 5) and (12, 12), respectively. The brightness is detected at every two pixels located on the lines extending horizontally and vertically from the center S. For example, in the case of the upper-left corner center S in FIG. 7, pixel (5, 5) of the center S, pixels (3, 5) and (1, 5) on the left side of center S, pixels (7, 5) and (9, 5) on the right side of center S, pixels (5, 7) and (5, 9) on the lower side of center S and pixels (5, 3) and 5, 1) on the upper side of the center S are selected, and the brightness of those pixels is detected by the brightness detecting means 53. In this manner, the brightness is detected at every two pixels located on the lines extending horizontally and vertically from each center S of the four equally divided sections of the small region 63. It is noted that the brightness is not necessarily detected at every two pixels, but may be detected for every distance of a half or one fourth of the bar width of the bar code 1. The width of the sections in which the brightness is detected starting from the center S is not made more than a half of the width of the small sampling regions 63, so that at least one bar is encountered in each sampling region 63 and the adjacent sampling region 63 is not reached. FIG. 8 shows a brightness distribution of pixels of the upper-left corner small sampling region 63 in FIG. 7, which is obtained by the above operation. In this case, pixel (5, 1) has a maximum brightness value of 148, and pixel (5, 14) has a maximum darkness value of 60.

Based on these detection results, the unit 51 selects pixel (5, 14) having the maximum brightness value as the measurement origin X of the upper-left corner small sampling region 63. Further, the unit 51 selects, as a threshold of light and dark, 70% of a difference between the maximum brightness value and the maximum darkness value, i.e., $(148-60) \times 0.7 + 60 = 122$. This type of selection is employed for the case where the bar code 1 is a dark image with respect to the background. Where the bar code 1 is a light image with respect to the background, the maximum brightness pixel is selected as the measurement origin and the threshold of light and dark is set such that the threshold = {(maximum brightness value) − (maximum darkness value)}0.3 + (maximum darkness value). The measurement origins X and the thresholds of light and dark of the remaining small sampling regions 63 are determined in the same manner, and are stored in the storing/specifying means 54 on a small region 63 basis. The thresholds of light and dark are estimated brightness values at the outline of the bar image of the bar code 1 to be used for detecting the outline.

Then, as shown on the left side of FIG. 9, in each of four small sampling regions 63, the number L of the pixels is counted from the measurement origin X to the point where the brightness reaches the threshold of light and dark of that small sampling region 63 in all directions spaced from each other by an angle of 3 degrees. The relative coordinates generating means 55 generates relative coordinates of the pixels located in the directions that are selected starting from the reference direction (i.e., vertical direction) and spaced from each other by the predetermined angular interval, in this case 3 degrees. The relative coordinates thus generated are added to the coordinates of the measurement origin X. The scanning width R is selected to be not more than 2.5 times the bar width in one direction, and not more than 5 times the bar width in two directions. The coordinates of each pixel are obtained by adding the relative coordinates sent from the generating means 55 to the coordinates (base) of the measurement origin X sent from the storing/specifying means 54; information concerning that pixel is accessed in the image memory 52 to examine its brightness value, which is done with comparator 56, and the number of pixels is counted until the threshold of the light and dark determined by threshold device 57 is reached.

Graphs to the right of FIG. 9 indicate, for the four respective small sampling regions 63, a relationship between the number L of pixels to the point where the brightness reaches the threshold (ordinate) and the angle Θ from the reference (vertical) direction (abscissa). In each small region 63, a peak in the number L of pixels appears in the direction of the bar, i.e., at Θ = 36 degrees. In the small region 63 shown at the bottom of FIG. 9, the measurement origin X is not located on the bar, but is instead on a small defect (noise), and therefore no peak appears in the graph shown to the right side of FIG. 9.

The accumulator 58 accumulates, for each direction, the number L of pixels from the measurement origin X to the point where the threshold is reached that have been measured in every direction in all the small sampling regions 63. FIG. 10 shows a result of the accumulation, in which the abscissa represents the angle Θ from the reference (vertical) direction and the ordinate represents the accumulated number of pixels. A maximum appears in the direction that is the same as the bar direction, Θ = 36 degrees. Therefore, the unit 51 determines that the direction having the maximum accumulated number of pixels is the angle Θ of the bar code 1, which means that the unit 51 has read out a number 2 that corresponds to this angle from the bar code 1.

The above operations are performed on the other bar codes 1 attached to the semiconductor chip that are included in the image of FIG. 4. As described above, the image of the bar code portion as the subject to be read is picked out on the basis of the predetermined distance from the upper-left corner of the semiconductor chip shown in FIG. 4.

According to the method described above, the directions of the respective bar codes 1 are detected with respect to the reference direction line, and the corresponding numbers can be read out.

Thus, according to the present invention, the subject region is not processed as a whole, but the processing is performed on a local region basis. Therefore, it is not necessary to scan the entire subject region, so that the processing time can be reduced and the bar code reading can be performed at high speed. Further, with this invention, the processing is performed so that the measurement origin and the threshold of light and dark are set in each of the small sampling regions. Therefore, the bar code information can be read correctly without being affected by the light and dark difference (shading) of the entire image. Further, as is understood from the above description, high-speed reading can be realized by the invention, because bar direction is read directly from the bar code input image of multilevel brightness and because image pre-processing for eliminating noise and other spurious data, and binarization are not required.

While the invention has been described in connection with specific embodiments, it will be understood that those with skill in the art may be able to develop variations of the disclosed embodiments without departing from the spirit of the invention of the scope of the following claims.

What is claimed is:

1. An apparatus for detecting the direction of a line segment in a multilevel brightness image, comprising:
   brightness detecting means for detecting brightness of a pixel in said image;
   means for selecting, from said image, a plurality of small sampling regions, each region having approximately the same area;
   means for detecting a maximum brightness value and a minimum brightness value among brightness values of the pixels in each of said small regions;
   means for setting a threshold of light and dark for each of said small regions on the basis of said maximum and minimum brightness values;
   means for setting a measurement origin in each of said small regions on the basis of said maximum and minimum brightness values;
   means for measuring a length from said measurement origin to a point where the brightness of the pixel reaches said threshold of light and dark for all directions in each of said small regions; and
   means for accumulating, for each direction, length values measured in said respective small regions and for selecting a direction having a maximum accumulated length value to be said line segment direction.

2. The apparatus of claim 1, further comprising means for generating said multilevel image.

3. A method for detecting the direction of a line segment in a multilevel brightness image, comprising the steps of:

selecting, from said image, a plurality of sampling regions, each region having approximately the same area;

detecting a maximum brightness value and a minimum brightness value among brightness values of pixels in each of said regions;

selecting a threshold of light and dark for each of said regions in accordance with maximum and minimum brightness values;

setting a measurement origin in each of said regions in accordance with said maximum and minimum brightness values;

measuring a length from said measurement origin to a point where brightness of the pixel reaches said threshold of light and dark for all directions in each of said regions;

accumulating, for each direction, length values measured in said respective regions; and selecting a direction having a maximum accumulated length value to be said line segment direction.

4. The method of claim 3 further comprising the step of generating said multilevel brightness image.

* * * * *